United States Patent [19]

van der Lely

[11] 4,071,089
[45] Jan. 31, 1978

[54] SOIL CULTIVATING IMPLEMENTS

[76] Inventor: Cornelis van der Lely, 7, Bruschenrain, Zug, Switzerland

[21] Appl. No.: 691,986

[22] Filed: June 2, 1976

[30] Foreign Application Priority Data

June 5, 1975 Netherlands .......................... 7506652

[51] Int. Cl.² ............................................. A01B 33/06
[52] U.S. Cl. ...................................... 172/59; 172/117; 172/657
[58] Field of Search ...................... 172/117, 49, 59, 63, 172/47, 72, 71, 68, 657, 619

[56] References Cited

U.S. PATENT DOCUMENTS

| 1,890,537 | 12/1932 | Frank | 172/59 |
| 3,115,190 | 12/1963 | Listiak | 172/49 |
| 3,667,551 | 6/1972 | Lely | 172/59 |
| 3,885,633 | 5/1975 | Lely | 172/117 |

Primary Examiner—Richard J. Johnson
Attorney, Agent, or Firm—Mason, Mason & Albright

[57] ABSTRACT

A cultivator has an elongated beamed frame and a plurality of soil working groups pivoted to a forward beam by at least one parallelogram linkage. The groups are pivoted to turn about pivot connections, that define horizontal axes that extend transverse to the direction of travel, responsive to ground undulations. Driving connection to each group is obtained through gear boxes mounted along a support that extends transverse to the direction of travel, between forward and rearward beams of the frame and each group is rotated about an axis defined by an upwardly extending shaft that is engaged by a transverse driving shaft housed in the support. The support can also be formed by elongated frame portions that are mounted side-by-side with driving shafts mounted on the tops of the frame portions. A tool bar with seeders can be attached to the rear beam through linkages and a supporting roller can be adjustably connected to the frame immediately to the rear of the soil working members to regulate their working depths. Each group includes a tube arm with tined soil working members mounted at the ends of the arm so as to be freely rotatable responsive to contact with the ground.

15 Claims, 8 Drawing Figures

SOIL CULTIVATING IMPLEMENTS

Figure 1:
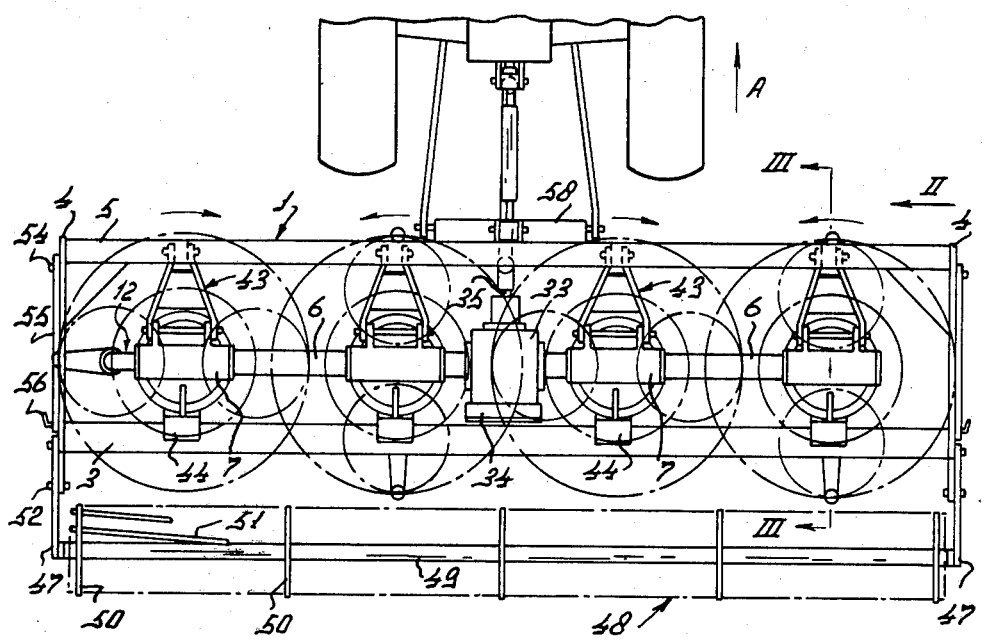
Figure 2:
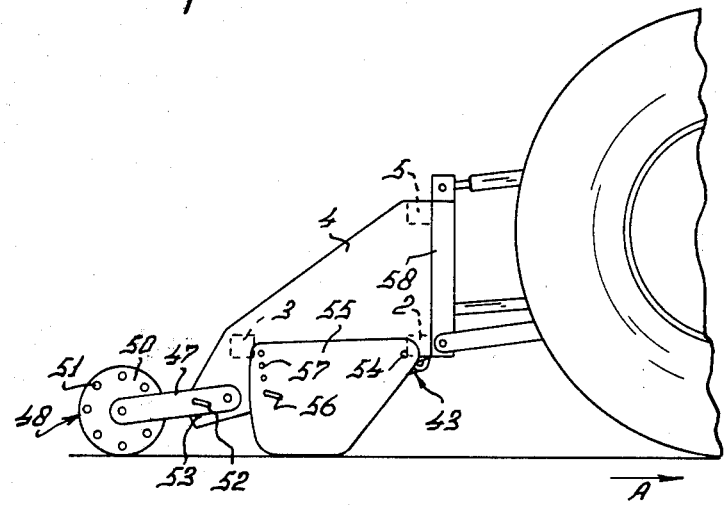
Figure 3:
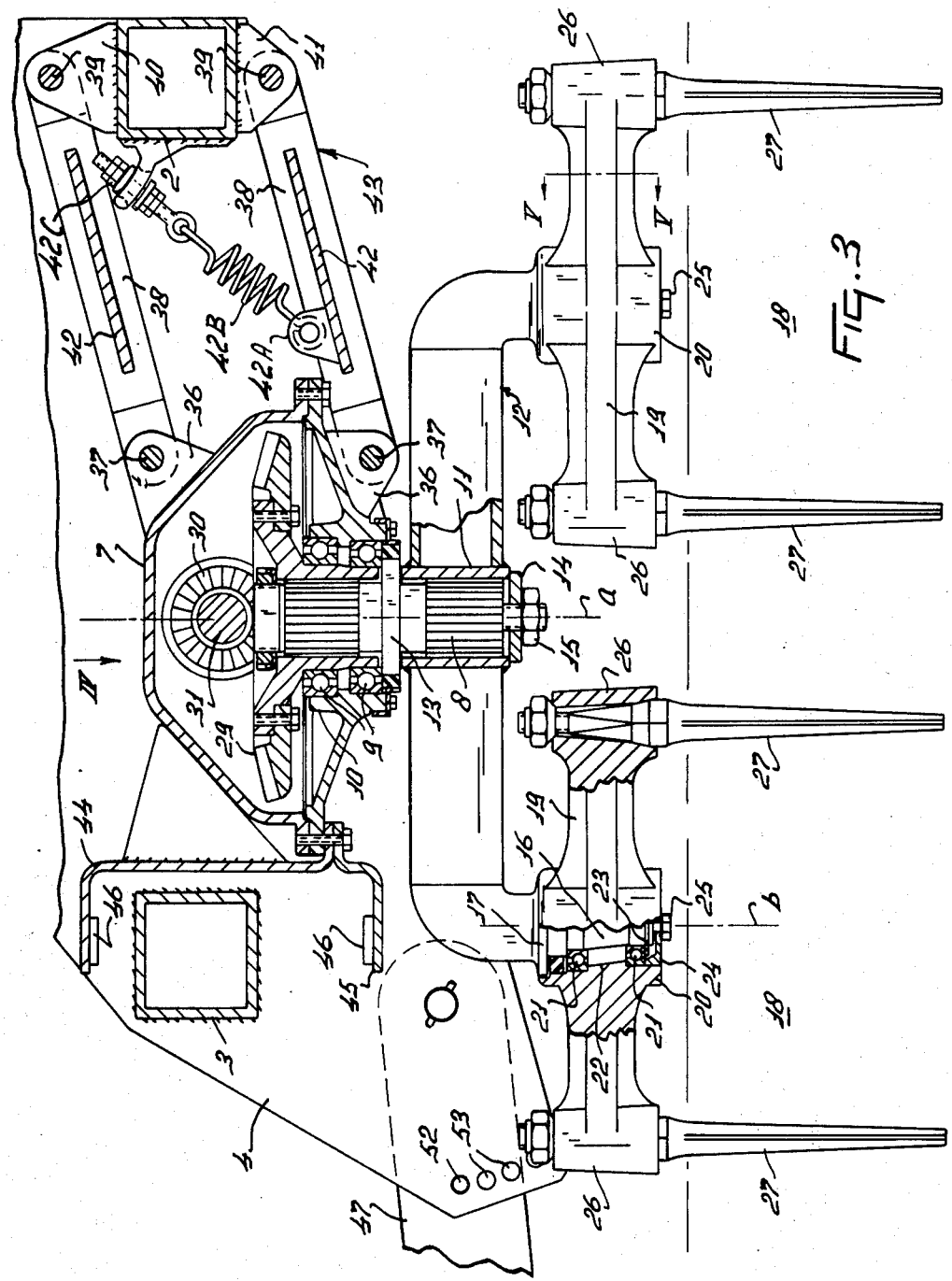
Figure 4:
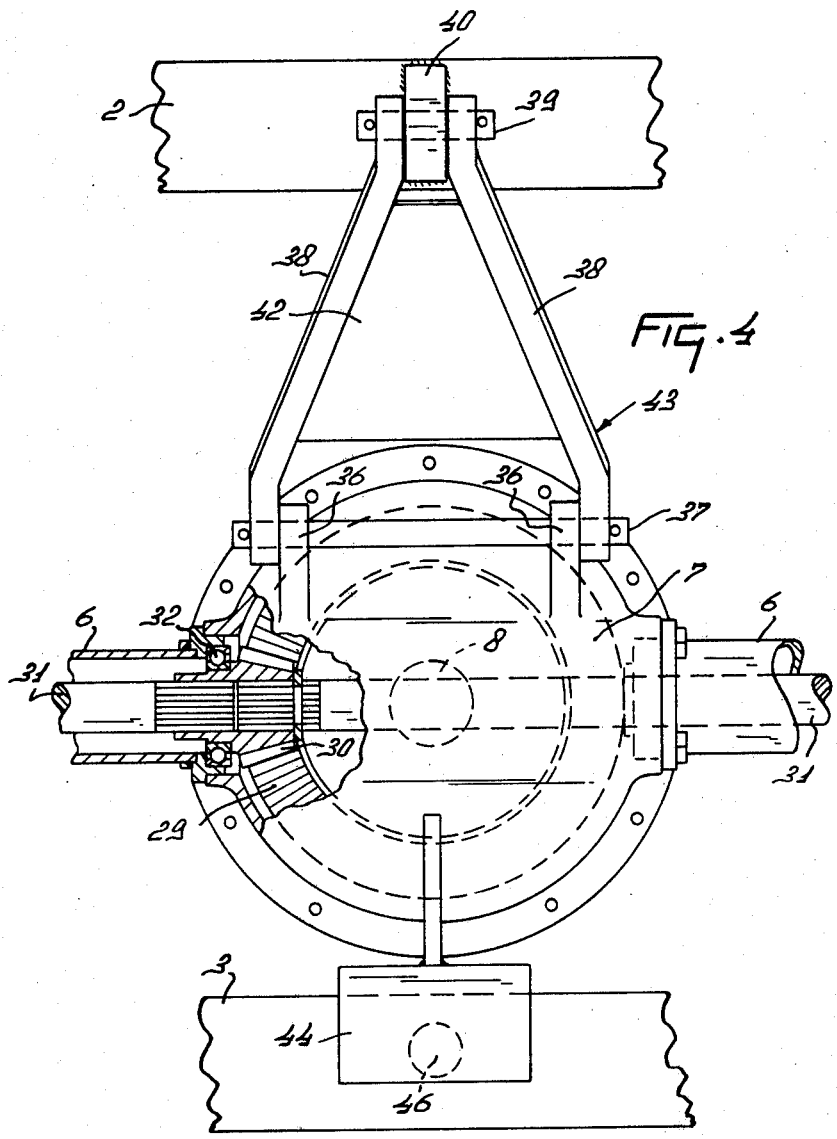
Figure 5:
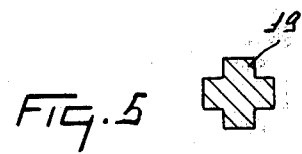
Figure 6:
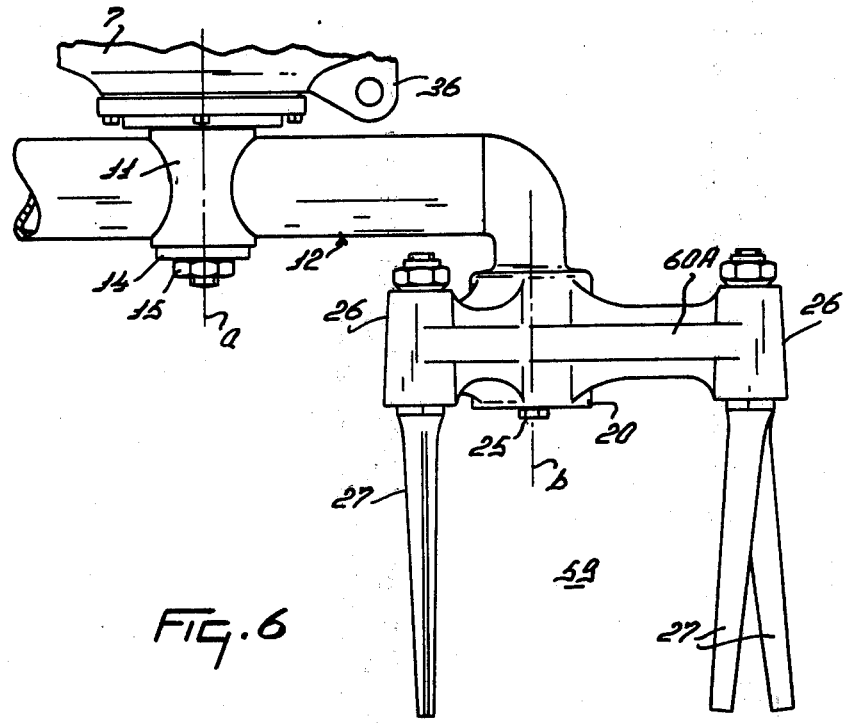
Figure 8:
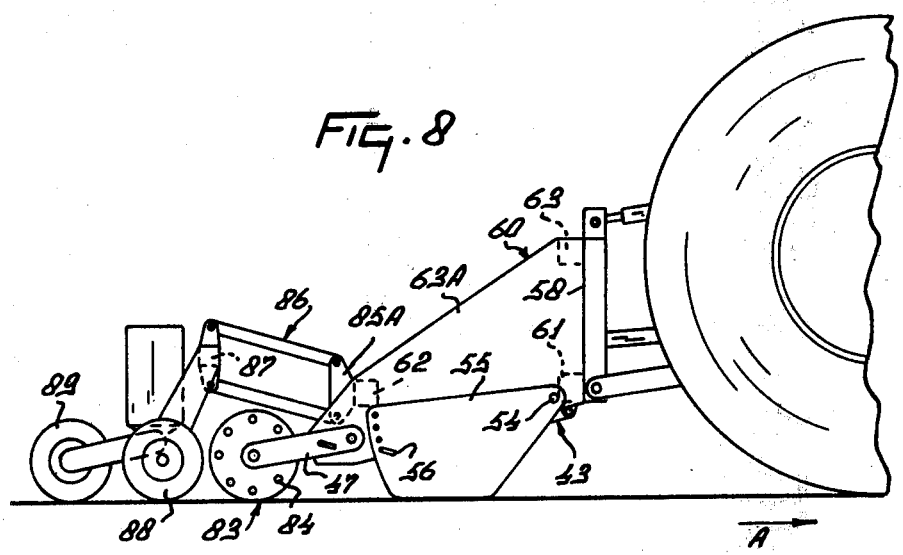
Figure 7:
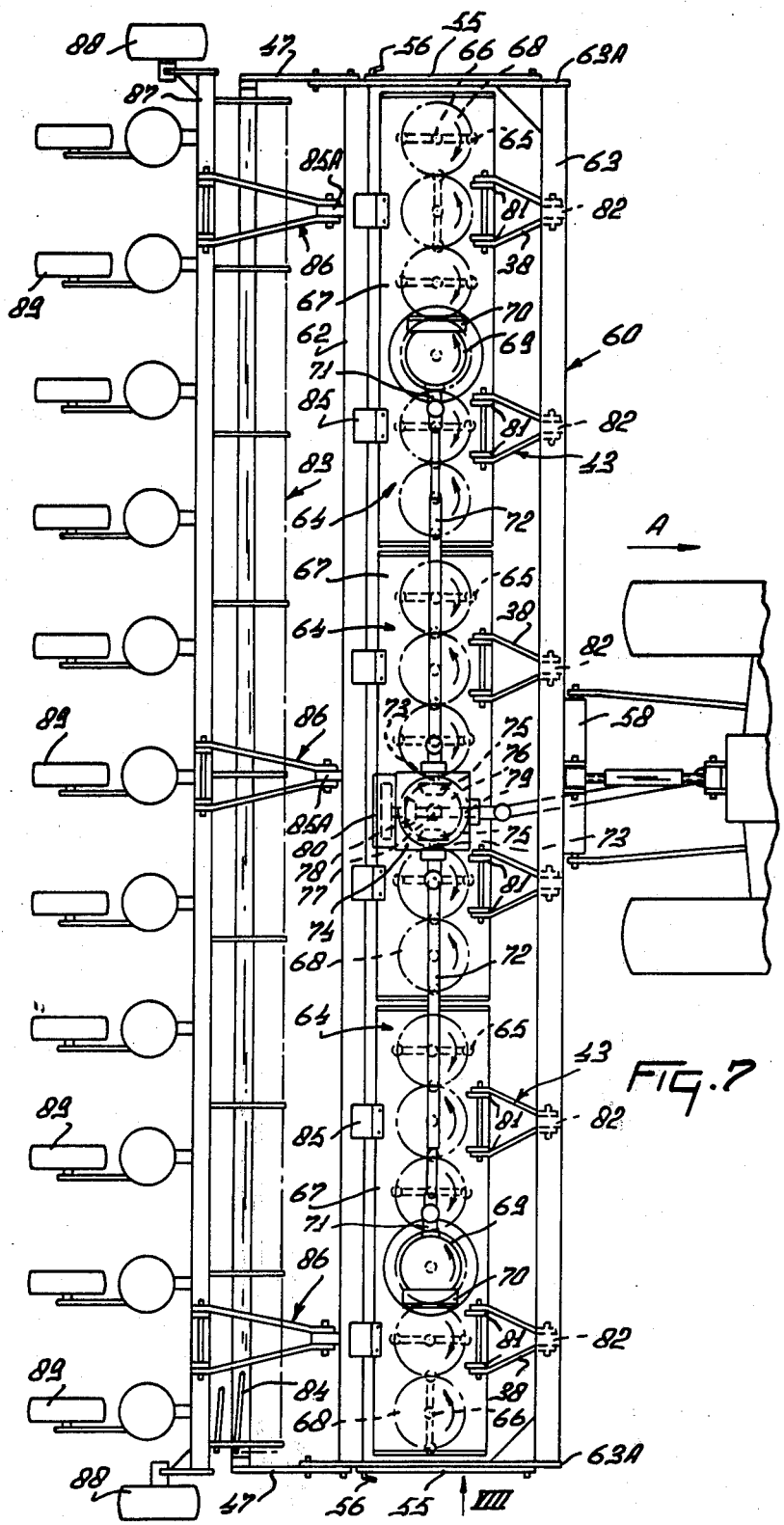

For a better understanding of the invention and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a part-sectional plan view as seen in the direction indicated by an arrow IV in FIG. 3, FIG. 5 is a section taken on the line V—V in FIG. 3, FIG. 6 is a somewhat similar view to FIG. 3 but illustrates an alternative soil working or cultivating member embodiment, FIG. 7 is a plan view of an alternative embodiment of a soil cultivating implement in accordance with the invention connected to the rear of an agricultural tractor, and FIG. 8 is a side elevation as seen in the direction indicated by an arrow VIII in FIG. 7.

Referring to FIGS. 1 to 5 of the drawings, the soil cultivating implement that is illustrated therein comprises a frame that is generally indicated by the reference 1, said frame including two beams 2 and 3 that extend substantially horizontally transverse, and usually substantially horizontally perpendicular, to the intended direction of operative travel of the implement that is indicated by an arrow A, the two beams 2 and 3 being in parallel relationship with the beam 3 spaced rearwardly from the beam 2 with respect to the direction A but at the same horizontal level as the beam 2. Each of the beams 2 and 3 is of square cross-section and, while this cross-sectional configuration is preferred, beams of other polygonal cross-sections may also be used. Side plates 4 that are both substantially vertically disposed in substantially parallel relationship with the direction A interconnect the ends of the two beams 2 and 3, said side plates 4 being of an irregular shape which can be seen in respect of one of them in FIG. 2. The side plates 4 extend rearwardly with respect to the direction A beyond the rear frame beam 3 and, in addition to their interconnection by way of the beams 2 and 3, they are rigidly interconnected by a third frame beam 5 that extends parallel to the beams 2 and 3 at a location spaced vertically above the beam 2, the beam 5 being of the same cross-sectional shape as the two beams 2 and 3. A common support 6 of circular cross-section is connected to the frame beam 2 in a manner that will be further described below so as to extend parallel to that beam in an upwardly and downwardly variable position that is approximately midway between the two beams 2 and 3 but actually a little closer to the rear frame beam 3 than to the leading frame beam 2 (see FIG. 3). The support 6 is provided with four gear boxes 7 two of which are located at substantially the opposite ends of the common support while the other two are located at intermediate positions therealong which are such that the centres of the four gear boxes 7 are spaced apart from one another at regular intervals. Each gear box 7 has a corresponding substantially vertical, or at least upwardly extending, shaft 8 rotatably journalled therein by means of upper and lower ball bearings 9 that are arranged in closely spaced apart relationship at the opposite ends of a corresponding bearing housing 10 that is integral with the bottom of the gear box 7 concerned.

Each shaft 8 projects downwardly beyond the bottom of the corresponding bearing housing 10 where it is externally splined and receives a matchingly internally splined hub 11 at the center of a corresponding substantially horizontally disposed tubular arm 12. As can be seen in FIG. 3 of the drawings, the upper end of each hub 11 abuts against the lower surface of a shoulder or flange 13 of the corresponding shaft 8 that is formed approximately midway along the upright length of that shaft at the bottom of the bearing housing 10 concerned while the lowermost end of each hub 11 is contacted by a corresponding thick washer 14 which is urged upwardly along the shaft 8 concerned by a retaining nut 15 which, with the washer 14, co-operates with a short screwthreaded lowermost end portion of that shaft 8. If desired, positive means, such as a split pin, may co-operate with each nut 15 to ensure that it will not work loose. The opposite ends of each arm 12 are bent over downwardly through substantially 90° to form corresponding downwardly tapering substantially vertically disposed stub shafts 16. The uppermost end of the downwardly tapering portion of each stub shaft 16 is afforded by a corresponding shoulder or flange 17 and the longitudinal axes $b$ of the stub shafts 16 are in parallel, or substantially parallel, relationship with the longitudinal axes $a$ of the corresponding shafts 8. The downwardly tapering portion of each stub shaft 16 has a corresponding soil working or cultivating member 18 mounted on it so as to be rotatable about the axis $b$ concerned.

Each soil working or cultivating member 18 comprises a substantially horizontally disposed support 19 that is of cruciform cross-section (see FIG. 5), the center of the support 19 being furnished with a hub 20 for rotatably co-operation with the corresponding stub shaft 16. Such rotation is allowed for by the provision of upper and lower vertically spaced apart ball bearings 21. The ball bearings 21 are located at the opposite upper and lower ends of a collar 22 of the hub 20 and their outer races co-operate with shoulders in the internal wall of said chamber. The inner races of the ball bearings 21 are arranged around cylindrically curved regions of the tapering portion of the corresponding stub shaft 16. The inner race of the lower smaller diameter ball bearing 21 bears by its lower surface against the upper surface of a circlip 23 whose inner edge engages in a groove formed in the stub shaft 16 concerned close to the lowermost end of that stub shaft. The top of each hub 20 is closed by the corresponding shoulder or flange 17 which is a close fit therein and beneath which a sealing ring is provided to protect the bearings 21 from contamination by dirt. The bottom of each hub 20 is closed by a corresponding cover plate 24 that fits into the mouth of the hub concerned and that is retained in its operative position by a central bolt 25 whose screwthreaded shank co-operates with a matchingly screwthreaded hole that extends axially into the stub shaft 16 from the lowermost end thereof.

The opposite ends of the support 19 of each soil working or cultivating member 18 comprise two sleeve-like tine holders 26 whose longitudinal axes are substantially parallel to the corresponding axis $b$. Each tine holder 26 receives the fastening portion of a corresponding rigid soil working tine 27 that also comprises a soil working portion which extends downwardly towards and/or into the soil from the respective tine holder 26. Although not readily apparent from FIGS. 1 to 5 of the drawings, the downwardly extending straight soil working portions of the tines 27 are inclined rearwardly by a few degrees from top to bottom with respect to the longitudinal axes of the corresponding straight fastening portions of the tines, the rearward inclination being relative to directions in which the members 18 are intended to revolve about the axes $b$ during the operation of the implement. The soil working portions of the tines 27 may thus be considered as being trailing with respect to those directions. Each positively rotated arm 12 and the corresponding pair of freely rotatable soil working or cultivating members 18 (each of which comprises two tines 27) constitutes a group 28 of soil working or cultivating members which group is positively rotatable, as a whole, about the common longitudinal axis $a$ of the corresponding shaft 8. There are, of course, four of the groups 28 and it will be evident from FIG. 1 of the drawings that they are arranged in a single row that is parallel to the frame beams 2, 3 and 5 and to the support 6 with the members 18 of each group so arranged that, during operation, their tines 27 will work overlapping strips of soil to produce, in effect, a single broad strip of worked soil that extends across the width of the implement. Arrows in FIG. 1 of the drawings indicate that, during operation, each group 28 is positively rotated about the corresponding axis $b$ in a direction that is opposite to the direction of rotation of its neighbour, or each of its neighbours, in the single row of four groups. An upper splined portion of each shaft 8 is provided, inside the corresponding gear box 7, with a crown wheel or other toothed pinion 29 whose teeth are in driven mesh with those of a smaller bevel pinion 30 that is secured to a common driving shaft 31 which extends axially through, and is rotatably mounted in, the hollow support 6 and its gear boxes 7 by way of horizontally disposed ball bearings 32 (FIG. 4). A central region of the support 6 is provided with a further gear box 33 inside which a further bevel pionion (not visible) has its teeth in driven mesh with those of a bevel pinion carried by a shaft (also not visible) that extends substantially horizontally parallel to the direction A. The rearmost end of the last mentioned shaft projects through the back of the gear box 33 into a change-speed gear 34 together with the rearmost end of an overlying shaft 35 that is also substantially horizontally parallel to the direction A. The rearmost ends of both the two substantially horizontal shafts that project into the change-speed gear 34 are splined or otherwise keyed to enable them to receive the matchingly splined or keyed hubs of a chosen pair of interchangeable and/or exchangeable pinions that have straight or spur teeth. Thus, the transmission ratio between the shaft 35 and the underlying substantially parallel shaft is determined by the particular pair of pinions that co-operates with those shafts in the change-speed gear 34 and the arrangement of said pinions on the shafts. The speed of rotation of the four soil working or cultivating member groups 28 can thus be increased or decreased, as may be desired, without having to change the speed of rotation that is applied to the splined or otherwise keyed end of the shaft 35 that projects forwardly in substantially the direction A from the front of the gear box 33.

Each of the four gear boxes 7 is provided at its front with horizontally spaced apart pairs of upper and lower lugs 36, horizontal pivot pins 37 being entered through the upper two lugs 36 of each gear box 7 and through the two lower lugs 36 thereof. The pivot pins 37 define upper and lower axes that are parallel to the longitudinal axes of the frame beams 2, 3 and 5. The rearmost ends of forwardly convergent arms 38 are coupled to the pins 37 alongside the relatively remote surfaces of the lugs 36 that correspond to each gear box 37 and it will be seen from FIGS. 1, 3 and 4 of the drawings that the leading ends of each pair of forwardly convergent arms 38 are bent over so as to extend parallel to one another, the short parallel portions of each pair being pivotally connected by a corresponding horizontal pin 39 to a corresponding upper lug 40 or lower lug 41 (see FIG. 3), said lugs 40 and 41 being welded or otherwise rigidly secured to the upper and lower surfaces of the frame beam 2, respectively. The pins 39 extend parallel to the pins 37 and to the frame beams 2, 3 and 5 and are spaced apart from one another vertically by substantially the same distance as are the upper and lower pivot pins 37. Each pair of forwardly convergent arms 38 is rigidly interconnected by a corresponding trapezoidal stiffening plate 42. The support 6 and the parts which it carries is thus connected to the beam 2 of the frame 1 by pivotable linkages in the form of four parallelogram linkages that are generally indicated by the references 43, said linkages 43 being respectively coupled to the four gear boxes 7. Between a lug 42A on a plate 42 on the lower arms 38 and a lug on the beam 2 a resilient mechanism 42B is provided which opposes the movement of the arms 38. With the embodiment shown, the mechanism 42B is afforded by a spring which opposes a downward movement. However, the said mechanism can also comprise a spring arrangement by means of which a downward or an upward movement is resiliently opposed. The tension of the spring shown in FIG. 3 can be adjusted by means of nuts 42C. Although not shown it will be appreciated that a construction whereby the arms 38 are freely pivotable is also possible. The linkages 43 allow the support 6 and the parts which it carries to move upwardly and downwardly without significant tilting, relative to the frame 1, said 1 being supported from the ground surface in a manner which will be described in detail below. The extent of the upward and downward movement of the support 6 which is possible relative to the frame 1 is limited by the provision, at the rear of each gear box 7, of a pair of upper and lower stops 44 and 45 which stops include limbs that are disposed above and beneath the flat upper and lower surfaces of the rear frame beam 3. These limbs of the stops 44 and 45 are substantially horizontally disposed and carry resilient pads 46 of natural rubber, synthetic rubber or a resilient synthetic plastics material. It will be evident from FIGS. 3 and 4 of the drawings that the stops 44 and 45 make contact with the beam 3 through the intermediary of the pads 46 when the support 6 reaches its upper, or lower, limit position relative to the frame 1.

The leading ends of two arms 47 are pivotally connected to the side plates 4 of the frame 1 by substantially horizontally aligned pivot pins at positions substantially vertically below the hindmost surface of the rear frame beam 3. The arms 47 are turnable upwardly and downwardly alongside the relatively remote outer surfaces of the two side plates 4 and their rearmost ends, which project some distance behind the side plates 4, carry substantially horizontally aligned bearings between which a supporting member 48, in the form of an open ground roller, is rotatably mounted. The supporting member 48 extends throughout substantially the whole of the working width of the four groups 28 of soil working or cultivating members and comprises a central tubular support 49 to which a plurality, such as five, of circular plates 50 are rigidly secured at regular intervals so that each plate 50 has its general plane in substantially parallel relationship with the direction A. Each plate 50 is formed, near its edge, with a plurality, such as eight, of holes and a corresponding number of elongated elements 51 of tubular, or solid rod-like, formation are entered through the holes in the successive plates 50 in such a way that each element 51 is wound helically to some extent around the substantially horizontal axis of rotation of the member 48 that corresponds with the longitudinal axis of its central support 49. Each side plate 4 is formed, close to its rearmost edge, with a curved row of holes 53 that are at equal distances from the axis about which the arms 47 are turnable relative to said side plates. The two arms 47 are formed with single holes at the same distance from said axis and horizontal locking pins 52, or equivalent locking bolts, are provided for entry through the holes in the arms 47 and chosen ones of the holes 53. It can be seen from the drawings that the holes 53 which are selected for co-operation with the locking pins 52, or equivalent locking bolts, determine the level of the axis of rotation of the supporting member 48 relative to that of the frame 1 and thus the level of said frame 1 above the ground surface during the operation of the implement. Upward and downward adjustments of the level of the axis of rotation of the supporting member 48 relative to the frame 1 also control the maximum depth to which the tines 27 of the four groups 28 of soil working or cultivating members can penetrate into the ground. Two stub shafts 54 that are substantially horizontally aligned in a direction that is perpendicular to the direction A are carried by the relatively remote outer surfaces of the two side plates 4 and each stub shaft 54 has a corresponding substantially vertical shield plate 55 mounted on it so as to be turnable upwardly and downwardly alongside the plate 4 concerned. The two shield plates 55 are substantially parallel to one another and to the direction A and the leading edges of both of them are inclined downwardly and rearwardly with respect to the same direction from the upper leading corners of the plates 55 that co-operate with the stub shafts 54. Lowermost edges of the plates 55 are horizontally or substantially horizontally disposed and are arranged to bear more or less slidably against the ground surface during the operation of the implement. Each shield plate 55 is provided, near the edge thereof that is rearmost with respect to the direction A with a curved row of holes 57 which holes are equidistant from the axis defined by the stub shafts 54. The side plates 4 are formed with single holes and horizontal locking pins 56, or equivalent bolts, are provided by which the shield plates 55 can be retained in chosen angular positions about the axis defined by the stub shafts 54 upon entering said locking pins 56, or the equivalent bolts, through the single holes in the side plates 4 and chosen holes 57. The shield plates 55 minimise ridging at the opposite edges of the broad strip of land that is worked by the implement during its use and greatly reduce the number of stones and other potentially dangerous objects that are flung laterally of the path of travel of the implement by its soil working or cultivating members 18 with a consequent reduction in the risk to adjacent persons, livestock and property. A coupling member or trestle 58 of generally triangular configuration is secured to the frame beams 2 and 5 at the front of the implement and at a location midway between the side plates 4. The coupling member or trestle 58 is constructed and arranged to enable the frame 1 of the implement to be connected to the threepoint lifting device or hitch at the rear of an agricultural tractor or other operating vehicle in a manner which is generally known per se and which can be seen in outline in FIGS. 1 and 2 of the drawings.

FIG. 6 illustrates the provision of the implement with freely rotatably soil working or cultivating members 59 which are similar to the previously described members 18 except that each of them comprises three arms 60A which radiate from the central hub 20 at locations which are spaced apart from one another at angles of substantially 120° around the corresponding axis $b$. It is noted that it can be seen, in FIG. 6 of the drawings, that the downwardly extending straight soil working portions of the tines 27 are inclined by a few degrees to the straight fastening portions of those tines.

In the use of the implement that has been described with reference to FIGS. 1 to 5 of the drawings, or with reference to FIGS. 1 to 5 as modified by FIG. 6 of those drawings, the coupling member or trestle 58 at the front of the implement is connected to the three-point lifting device or hitch at the rear of an agricultural tractor or other operating vehicle and a telescopic transmission shaft, which is of a construction that is known per se having universal joints at its opposite ends, is employed to place the forwardly projecting rotary input shaft 35 of the gear box 33 in driven connection with the power take-off shaft of the same tractor or other operating vehicle. Adjustments are, if required, made before the implement commences work and these adjustments include setting the level of the axis of rotation of the member 48 relative to the frame 1 with the aid of the locking pins 52 or equivalent bolts to control the maximum depth to which the tines 27 can penetrate into the soil, setting the positions of the shield plates 55 about the stub shafts 54 to match the level chosen for the rotary supporting member 48 relative to the frame 1, and altering the transmission ratio in the change-speed gear 34 to govern the speed of rotation of the groups 28 about the axes $a$ having regard to the nature and condition of the soil that is to be worked and the result that is required after the cultivating/harrowing operation. When the machine actually commences work, the groups 28 are, most of the time, resiliently supported. Each group 28 of soil working or cultivating members is positively rotated about the corresponding common axis $a$ in a direction which is opposite to that of the neighbouring group 28, or each of the two neighbouring groups 28, in the single row of four groups. Each individual soil working or cultivating member 18 or 59 also tends to rotate about the corresponding axis $b$ relative to the stub shaft 16 concerned because the downwardly extending portions of its tines 27 penetrate into the soil with the two, or three, soil working portions concerned both or all being inclined rearwardly relative to one circular direction centred upon the corresponding axis $b$. The arrangement is, in fact, such that each member 18 tends to rotate more or less regularly about the corresponding axis $b$ in the same direction as does the group 28 of which it froms a part about the corresponding axis $a$. As previously mentioned, the strips of land that are worked by the four groups 28 overlap to produce a single broad strip of worked soil.

If, during operation, one of the soil working or cultivating members 18 or 59 should engage a large stone or other substantially immovable obstacle in the soil, all four groups 28 can move upwardly to allow the member concerned to ride over that obstacle by bodily displacement of the four groups and their common support 6 upwardly relative to the frame 1 by angular displacement of the four parallelogram linkages 43. It will be realised from FIG. 3 of the drawings that such bodily upward displacement cannot take place beyond a level at which the pads 46 of the lower stops 45 come into abutting engagement with the lower surface of the rear frame beam 3. The four groups 28 of soil working or cultivating members and their support 6 (including the gear boxes 7 and 33) are relatively light in weight as compared with the combined weight of the frame 1 and the other parts of the implement so that said groups 28 can move bodily upwards and downwards quite easily, such displacements being particularly facilitated by the omission of a heavy supporting member or members that is or are directly connected to the groups 28. The described constructions and arrangements are effective in reducing the incidence of damage to the parts of each group 28 while the implement is, nevertheless, very effective in operation and can readily match undulations in the surface of the soil that it has to deal with. The soil working or cultivating members 18 or 59 of the two groups 28 that are located at the opposite ends of the row of four such groups co-operate, during operation, with the shield plates 55 and, as mentioned above, little, if any, ridging is produced at the opposite lateral edges of the broad strip of land that is worked by the implement. It is preferred, but is not essential, that the distance between each axis $a$ and the or each immediately neighbouring axis $a$ should be 60 – 66 centimeters. It is preferred, but is not essential, that the distance between the two axes of rotation $b$ in each group 28 should be substantially 45 and preferably 37,5 centimeters. With these dimensions, the distance between each axis $b$ and the corresponding axis $a$ is substantially three-quarters of the working width of one of the soil working or cultivating members 28 or 59, the latter dimension having a magnitude of substantially 30 centimeters. The implement is arranged for inoperative transport by lifting it clear of the ground by raising the three-point lifting device or hitch of the agricultural tractor or other operating vehicle to which the implement is connected. When the implement is so lifted, the pads 46 that are carried by the upper stops 44 bear downwardly against the upper surface of the underlying rear frame beam 3 and prevent the groups 28 from moving too far downwardly.

FIGS. 7 and 8 of the drawings illustrate an alternative soil cultivating implement in accordance with the invention in which, however, a number of the parts of the implement are similar, or identical, to parts thereof that have already been described with reference to FIGS. 1 to 6 of the drawings. Accordingly, for the sake of brevity, such parts are indicated in FIGS. 7 and 8 of the drawings by the same references as have been employed in FIGS. 1 to 6 and will not be described again in detail. The implement of FIGS. 7 and 8 of the drawings has a frame 60 which comprises two beams 61 and 62 that both extend substantially horizontally transverse, and usually substantially horizontally perpendicular, to the intended direction of operative travel A in spaced apart relationship, the two beams 61 and 62 being at substantially the same horizontal level with the beam 61 in advance of the beam 62 with respect to the direction A. A third frame beam 63, that is parallel to the beams 61 and 62, is disposed vertically above the frame beam 61 at a level above that of the beams 61 and 62. As in the embodiment of FIGS. 1 to 6 of the drawings, each of the three beams 61 to 63 is of square cross-section but beams having other polygonal cross-sections may, if preferred, be used instead. The ends of the three beams 61, 62 and 63 are rigidly interconnected by side plates 63A that are both substantially vertically disposed in parallel relationship with one another and substantially parallel relationship with the direction A. In this embodiment, there are three groups 64 of soil working or cultivating members 65, the three groups 64 being arranged in a single row that is substantially parallel to the frame beams 61, 62 and 63 with each group arranged so as to be upwardly and downwardly displaceable relative to the frame 60 independently of the other two groups. Each of the three groups 64 has a width, in a direction that is perpendicular to the direction A, of substantially 1.5 meters and each group comprises six of the soil working or cultivating members 65 that are secured to the lowermost ends of six corresponding substantially vertical, or at least upwardly extending, shafts 66. Each set of six shafts 66 is rotatably journalled in a corresponding hollow frame portion 67 with the axes of rotation of the six shafts spaced apart from one another at regular intervals which are preferably , but not essentially, substantially 25 centimeter intervals. Each shaft 66 is provided, inside the corresponding hollow frame portion 67, with a straight-toothed or spur-toothed pinion 68, said pinions 68 being dimensioned and disposed in such a way that the teeth of each pinion are in mesh with those of its immediate neighbour, or both of its immediate neighbours, in the single row that corresponds to the group 64 concerned.

Each soil working or cultivation member 65 comprises a substantially horizontal support in the form of an arm whose center is fastened to the lowermost end of the shaft 66 concerned, said end projecting downwardly from beneath the bottom of the corresponding hollow frame portion 67. The opposite ends of the supports are provided with holders in which the fastening portions of tines that may be identical to the previously described tines 27 are secured. As mentioned above, each of the three hollow frame portions 67 rotatably supports six of the shafts 66 and one of the center pair of each of those six shafts that corresponds to the outer two groups 64 in the row of three groups has an upward extension into a corresponding gear box 69 that is fastened to the top of the respective frame portion 67. The two upward shaft extensions carry bevel pinions inside the gear boxes 69 and those bevel pinions have their teeth in driven mesh with those of further bevel pinions carried by substantially horizontal shafts (not visible) that extend perpendicular to the direction A. The outermost ends (with respect to the centre of the implement) of the substantially horizontal shafts and the outermost ends of overlying and parallel shafts 71 project through corresponding walls of the gear boxes 69 into change-speed gears 70. The ends of the shafts that project into the change-speed gears 70 are splined or otherwise keyed for the interchangeable and/or exchangeable reception of the correspondingly splined or keyed hubs of straight-toothed or spur-toothed pinions of different sizes. The purpose of this arrangement is the same as that which has been briefly described above in connection with the change-speed gear 34 of the embodiment of FIGS. 1 to 6 of the drawings. The two shafts 71 project from the two gear boxes 69 towards the center of the implement and are connected by corresponding telescopic transmission shafts 72, having universal joints at their opposite ends, to two laterally projecting output shafts 73 of a gear box 74 which is mounted on top of the central frame portion 67 of the row of three such frame portions for co-operation with an upward extension of one of the center pair of six shafts 66 that are rotatably journalled in that hollow frame portion. Each of the two output shafts 73 is provided, inside the central gear box 74, with a corresponding bevel pinion 75 and the teeth of both bevel pinions 75 are in mesh with those of a bevel pinion or crown wheel 76 which is mounted on a substantially vertical shaft 77 coaxial with, but separately rotatable from, the upward extension of the underlying soil working or cultivating member shaft 66. A shaft 79 that extends substantially horizontally parallel to the direction A is rotatably journalled in the central gear box 74 and carries a bevel pinion 78 whose teeth are in driving mesh with the larger bevel pinion or crown wheel 76. The rearmost end of the shaft 79 with respect to the direction A projects through the back of the central gear box 74 into a change-speed gear 80 together with the rearmost end of a further shaft (not visible) that is parallel to the shaft 79 but located vertically therebeneath. The ends of the two shafts that project into the change-speed gear 80 are splined or otherwise keyed and co-operate with the matchingly splined or keyed hubs of interchangeable and/or exchangeable straight-toothed or spur-toothed pinions of different sizes for the same purpose as has already been briefly described above in connection with the change-speed gear 34 of the embodiment of FIGS. 1 to 6 of the drawings. The lower substantially horizontal shaft of the gear box 74 that is substantially parallel to the direction A co-operates drivingly by way of bevel pinions (not visible) with the above mentioned upward extension of one of the shafts 66. The shaft 79 has a leading splined or otherwise keyed end which projects forwardly from the front of the central gear box 74 in substantially the direction A to enable it to be placed in driven connection with the power take-off shaft of an agricultural tractor or other operating vehicle by way of an intermediate telescopic transmission shaft that is of a construction which is known per se having universal joints at its opposite ends. The fronts with respect to the direction A, of the three hollow frame portions 67 are each provided with pairs of upper and lower lugs 81 of which only the upper lugs are visible in FIG. 7 of the drawings. The lugs 81 are pivotally connected to upper and lower lugs 82 carried by the top and bottom surfaces of the frame beam 61 to form a total of six of the parallelogram linkages 43 that have been described in detail above. It will, however, be noted that, in this embodiment, each of the three hollow frame portion 67 that corresponds to each of the three groups 64 of soil working or cultivating members is connected to the frame 60 by only a corresponding two of the six parallelogram linkages 43, those linkages being so arranged that each group 64 is upwardly and downwardly displaceable relative to the frame 60 independently of the other two groups.

The rear of the frame 60 with respect to the direction A is provided with a rotatable supporting member 83 that is in the form of an open ground roller comprising a plurality, such as eight, of circumferentially mounted elongated elements 84 which are wound helically around the axis of rotation of the member 83. The rotatable supporting member 83 extends throughout the total working width of the three groups 64 and is similar in construction and mounting to the previously described rotatable supporting member 48 except that it has a considerably greater axial length. The previously described shield plates 55 are connected, in a pivotally adjustable manner, to the relatively remote surfaces of the two side plates 63A of the frame 60 at locations immediately beyond the opposite ends of the row of eighteen soil working or cultivating members 65, said shield plates 55 being substantially identical to those that have been described above. The previously described coupling member of trestle 58 is secured to the fronts of the frame beams 61 and 63 at a location midway between the planes of the two sides plates 63 A of the frame 60.

When the soil cultivating implement of FIGS. 7 and 8 of the drawings is to be used, its coupling member or trestle 58 is connected to the three-point lifting device or hitch at the rear of an agricultural tractor or other operating vehicle and the forwardly projecting rotary input shaft 79 of its central gear box 74 is placed in driven connection with the power take-off shaft of the same tractor or other vehicle by way of an intermediate telescopic transmission shaft of the kind that has been described above. As in the case of the embodiment of FIGS. 1 to 6 of the drawings, the adjustments that may be required before work commences include setting the level of the axis of rotation of the supporting member 83 relative to that of the frame 60, setting the positions of the shield plates 55 to match the level setting of the member 83 relative to the frame and selection of appropriate transmission ratios in the three change-speed gears 70 and 80. The change-speed gears 70 and 80 will, of course, almost always be arranged so that all eighteen of the soil working or cultivating members 65 will rotate at the same speed when rotary drive is applied to the input shaft 79 of the central gear box 74 but it is noted that, in very exceptional operating circumstances, the members 65 of one group 64 could be arranged to rotate at a faster or slower speed than those of the other two groups 64 or the members 65 of all three groups 64 could be arranged to revolve at different speeds. As the implement moves over a field with the members 65 of its three groups 64 all rotating in the directions that are indicated by small arrows in FIG. 7 of the drawings, the three groups 64 can move upwardly and downwardly relative to the frame 60 independently of one another to match undulations in the surface of the soil which is being worked and to allow the members of at least one group 64 to ride upwardly over an embedded stone or other substantially immovable obstacle. Such movements entail upward and downward displacements about the substantially horizontal axes of the pivot pins which co-operate with the upper and lower lugs 82 carried by the frame beam 61. Once again, each group 64 is quite light in weight relative to the combined weight of the frame 60 and the other parts of the implement so that it can move upwardly and downwardly without difficulty. Such upward and downward displacements of the groups 64 relative to the frame 60 are limited, as in the embodiment of FIGS. 1 to 6 of the drawings, by upper and lower stops 85 (of which only the upper stops are visible in FIG. 7 of the drawings), said stops 85 co-operating with the rear frame beam 62 and there being a total of six upper and lower stops 85 with two of them carried by each of the three hollow frame portions 67. The two tines 67 of each member 65 are spaced apart from one another by a marginally greater distance than the spacing (preferably substantially 25 centimeters) between the axes of rotation of neighbouring shafts 66 in each group 64 so that the six members 65 of each group 64 effectively overlap one another and produce a single strip of worked soil. The members 65 which are located alongside the two junctions between the three groups work adjoining, if not marginally overlapping, strips of soil so that the implement works a single broad strip of land, having a width of substantially 4½ meters, without any noticeable discontinuities at locations which are in register, in the direction A, with the two junctions between the three groups 64.

The rear frame beam 62 is provided with three rearwardly projecting brackets 85A at a central location and at two locations close to the opposite ends of said beam 62. The brackets 85A have a considerable vertical extent (see FIG. 8) and each of them is connected by a corresponding pivotable linkage in the form of a parallelogram linkage 86 to upper and lower lugs carried by a substantially horizontal tool bar 87 that is in substantially parallel relationship with the frame beams 61, 62 and 63. Downwardy and rearwardly inclined arms at the opposite ends of the tool bar 87 carry the horizontally aligned axles of two ground wheels 88 which wheels 88 directly sustain the tool bar 87 from the ground surface. The tool bar 87 is capable of carrying agricultural tools or implements of a number of different kinds and, for example it is illustrated as being provided with a row of eleven regularly spaced apart precision seed sowing mechanisms 89 each of which incorporates its own ground wheel. The tool bar 87 and the parts which it carries can move upwardly and downwardly relative to the frame 60 about the axes of the horizontal pivot pins that connect the parallelogram linkages 86 to the brackets 85A. The parallelogram linkages 86 are generally similar in construction and arrangement to the previously described linkages 43 but, generally speaking, do not need to incorporate stiffening plates corresponding to the previously described stiffening plates 42 since they do not have to withstand heavy laterally acting forces as do the linkages 43 in the embodiment of FIGS. 1 to 6 of the drawings. The pivot pins by which the linkages 86 are connected to the brackets 85A are conveniently in the form of releasable pivot bolts so that, when not required, the whole tool are 87 and the parallelogram linkages 86 may be detached from the remainder of the implemen In the embodiment of FIGS. 7 and 8 of the drawings, there are three of the groups 64 of soil working or cultivating members 64 that are arranged in a substantially horizontal row that is substantially perpendicular to the direction A but this is not essential and, although not illustrated, an implement may be provided which comprises a single similarly arranged group or two such groups or even more than three such groups, the or each group being bodily upwardly and downwardly displaceable relative to a frame, equivalent to the frame 60, that is directly sustained from the ground surface by a supporting member equivalent to the rotatable supporting member 83. In the case of an implement having only a single group, that group may have an effective working width of 2½, 3, 4, 4½ meters or even more and it will be evident that other working widths can be provided in implements which have two or more separate groups of soil working or cultivating members.

Although various features of the soil cultivating implements that have been described and/or that are illustrated in the accompanying drawings will be set forth in the following claims as inventive features, it is emphasised that the invention is not necessarily limited to those features and that it includes within its scope each of the parts of each soil cultivating implement that has been described, and/or that is illustrated in the accompanying drawings, both individually and in various combinations.

What we claim is:

1. A cultivator implement comprising a frame and at least one group of soil working members being supported on said frame, each of said soil working members being rotatable about an upwardly extending axis and driving means connected to rotate said soil working members, a ground engaging supporting member being positioned to the rear of said soil working members and said supporting member being interconnected to said frame with setting means that fixes the relative horizontal positions of said frame and supporting member, said group of soil working members being mounted on a substantially horizontal support and said support being pivoted to said frame by at least one linkage, said support together with said soil working members being vertically displaceable about pivot means of the linkage relative to both said frame and said ground engaging member to avoid obstacles during operation, stop means on said implement being positioned to limit the extreme vertical movement of said group of soil working members in at least one direction with respect to said frame.

2. An implement as claimed in claim 1, wherein there are a plurality of groups of soil working members and said driving means is connected to a respective gear box mounted on each of said groups, said soil working members being in a row that extends transverse to the direction of travel.

3. An implement as claimed in claim 2, wherein said horizontal support comprises beam means that extends transverse to the direction of travel and said beam means houses said driving means.

4. An implement as claimed in claim 3, wherein said stop means includes at least one stop that is attached to the rear of each group.

5. An implement as claimed in claim 1, wherein each soil working member has downwardly extending tines and said supporting member is an elongated roller that is interconnected to said frame by arm means.

6. An implement as claimed in claim 1, wherein said support is located between two beams of said frame, said support and beams extending transverse to the direction of travel and a stop on said support being located to the rear of each group, said stop being positioned to cooperate with the rearmost frame beam.

7. A cultivator implement comprising a frame and a plurality of groups of soil working members being supported on said frame, said soil working members being rotatable about axes defined by corresponding upwardly extending shafts supported on elongated beam means that extend horizontally transverse to the direction of travel, said beam means housing driving means connected to rotate said soil working members about said axes, a ground engaging supporting member being positioned to the rear of said soil working members and said supporting member being interconnected to said frame with setting means that fixes the relative horizontal positions of said frame and supporting member, said beam means being pivoted to said frame by at least two spaced apart linkages, said groups of soil working members being vertically displaceable about pivots of said linkages, relative to both said frame and said ground engaging member to avoid obstacles during operation, stop means on said implement being positioned to limit the extreme vertical movements of said groups of soil working members.

8. An implement as claimed in claim 7, wherein there are at least three groups of soil working members arranged in a row and each of said three groups is connected to said frame by at least one parallelogram linkage.

9. An implement as claimed in claim 8, wherein the soil working members of each group are supported on a corresponding hollow frame portion that houses a drive transmission to the members of that group.

10. An implement as claimed in claim 7, wherein said stop means comprises upper and lower stops adjacent the rear side of at least one of said groups, said stops being positioned to cooperate with said frame to limit the extreme vertical movements of that one group.

11. An implement as claimed in claim 7, wherein said linkages are parallelogram linkages and springs on said linkages resist the downward movements of said groups.

12. A cultivator implement comprising a frame and at least two groups of tined soil working members being supported on said frame, said soil working members being rotatable about axes defined by upwardly extending shafts supported on elongated beam means housing driving means connected to rotate said soil working members about said axes, a ground engaging supporting roller being positioned to the rear of said soil working members and said roller being interconnected to said frame with setting means that fixes the relative horizontal positions of said frame and roller, said beam means being pivoted to said frame by at least two spaced apart linkages, said groups of soil working members being vertically displaceable independently of one another about pivots of the linkages, relative to both said frame and said ground engaging member to avoid obstacles during operation, stop means on said implement being positioned to limit the extreme vertical movements of said groups of soil working members.

13. An implement as claimed in claim 12, wherein each of said groups is supported on a hollow elongated frame portion and a plurality of soil working members of each group are positioned in a row that extends transverse to the direction of travel.

14. A cultivator implement as claimed in claim 12, wherein said shafts are positioned in a row that extends transverse to the direction of travel.

15. A cultivator implement comprising a frame and at least one group of soil working members being supported on said frame, each of said soil working members being rotatable about an upwardly extending axis and driving means connected to rotate said soil working members, a ground engaging supporting member being positioned to the rear of said soil working members and said supporting member being interconnected to said frame with means that establishes the relative horizontal positions of said frame and supporting member, said group of soil working members being mounted on a substantially horizontal support and said support being pivoted to said frame by at least one linkage, said support together with said soil working members being vertically displaceable about pivot means of the linkage relative to both said frame and said ground engaging member to avoid obstacles during operation, stop means on said implement being positioned to limit the extreme vertical movement of said group of soil working members in at least one direction with respect to said frame.

* * * * *